United States Patent [19]
Ono et al.

[11] 3,926,846
[45] Dec. 16, 1975

[54] CATALYSTS FOR THE PREPARATION OF PHTHALIC ANHYDRIDE

[75] Inventors: Tetsuji Ono, Amagasaki; Yoshiyuki Nakanishi, Ikeda; Takehiko Suzuki, Takatsuki; Yukio Okuda, Toyonaka, all of Japan

[73] Assignee: Nippon Shokubai Kagaku Kogyo Co., Ltd., Japan

[22] Filed: Oct. 15, 1973

[21] Appl. No.: 406,285

Related U.S. Application Data

[63] Continuation-in-part of Ser. No. 300,656, Aug. 25, 1972, abandoned.

[52] U.S. Cl. ............. 252/435; 252/437; 260/346.4; 260/346.7
[51] Int. Cl.² .......................................... B01J 27/18
[58] Field of Search ........................... 252/435, 437

[56] References Cited
UNITED STATES PATENTS

| | | | |
|---|---|---|---|
| 3,255,211 | 6/1966 | Kerr | 252/435 X |
| 3,288,721 | 11/1966 | Kerr | 252/435 |
| 3,351,565 | 11/1967 | Kerr | 252/437 |
| 3,684,741 | 8/1972 | Friedrichsen et al. | 252/435 |

*Primary Examiner*—Patrick P. Garvin
*Attorney, Agent, or Firm*—Armstrong, Nikaido & Wegner

[57] ABSTRACT

A catalyst for the preparation of phthalic anhydride by vapor phase catalytic oxidation of either ortho-xylene or naphthalene with a molecular oxygen-containing gas which comprises a catalytically active substance supported on a porous inert carrier, said catalytically active substance comprising 1 to 20 parts by weight of $V_2O_5$ and, correspondingly, 99 to 80 parts by weight of $TiO_2$ and, based on the total weight of the $V_2O_5$ and $TiO_2$, 0.02 to 5.0 % by weight of $Nb_2O_5$, 0.1 to 5.0 % by weight of $P_2O_5$, 0 to 0.25 % by weight of $K_2O$ and 0 to 0.5% by weight of $Cs_2O$, the total weight of $K_2O$ and $Cs_2O$ being at least 0.05 % by weight and optionally 0 to 5.0 % by weight of at least one member selected from the group consisting of rare earth elements, ZnO and $Tl_2O$.

8 Claims, 1 Drawing Figure

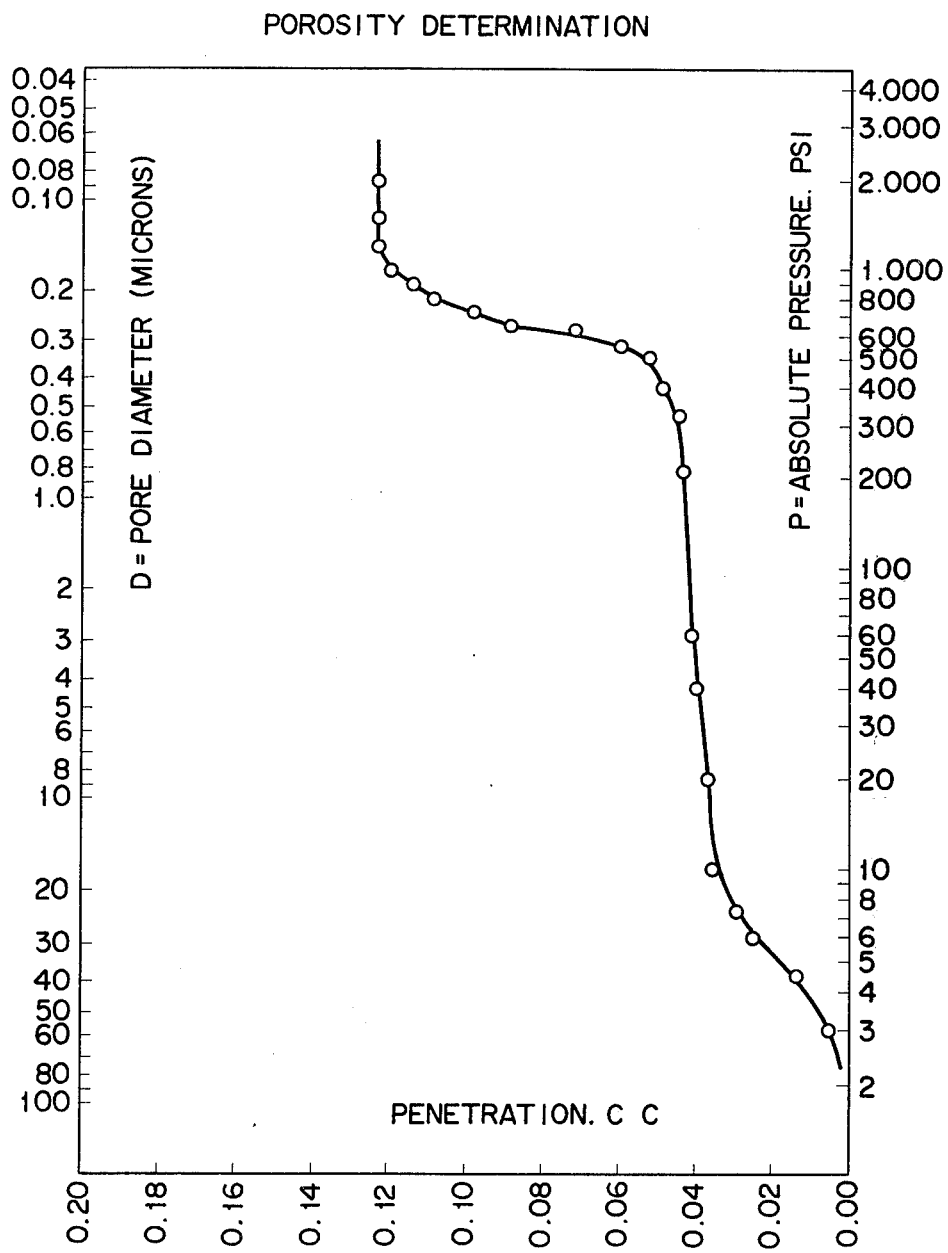

CATALYSTS FOR THE PREPARATION OF PHTHALIC ANHYDRIDE

CROSS REFERENCE TO RELATED APPLICATIONS

This application is a continuation-in-part of our co-pending application Ser. No. 300,656, filed Oct. 25, 1972, now abandoned.

BACKGROUND OF THE INVENTION

This invention relates to a catalyst for the preparation of phthalic anhydride by vapor phase catalytic oxidation of either ortho-xylene or naphthalene with a molecular oxygen-containing gas. In particular, it is concerned with a catalyst for the preparation of phthalic anhydride which comprises vanadium oxide $V_2O_5$-titanium oxide $TiO_2$-niobium oxide $Nb_2O_5$-phosphorus oxide $P_2O_5$ incorporated with potassium oxide $K_2O$ and/or cesium oxide $Cs_2O$ and, optionally, at least one member selected from the group consisting of oxides of rare earth elements, zinc oxide ZnO and thallium oxide $Tl_2O$, supported on a porous inert carrier.

A number of $V_2O_5$-$TiO_2$ catalysts for the preparation of phthalic anhydride have hitherto been known as disclosed in, e.g., U.S. Pat. Nos. 2,034,896, 2,698,306, 3,055,842, 3,215,644, 3,464,930 and 3,565,829, Japanese Patent Publication No. 7737/1962, 25993/1963, 18103/1964 and 7537/1972 and Japanese Patent Open No. 5661/1972.

These known catalysts for the preparation of phthalic anhydride exhibit high catalytic activities through synergy of the components, but they have some problems in practical use, e.g. in life of catalyst and mechanical strength, and are unsatisfactory in the yield of phthalic anhydride. For instance, the $V_2O_5$-$TiO_2$ catalyst disclosed in U.S. Pat. No. 3,464,930 can not always be said to be an advantageous catalyst from industrial point of view because of poor adhesion of catalyst components to a carrier due to a high surface smoothness of the non-porous carrier to be used, such as unglazed porcelain, aluminum silicate or magnesium silicate: this poor adhesion results in a weakness of the catalyst against physical and mechanical shock encountered during transporation and feeding the catalyst into an oxidation reactor and causes abrasion or exfoliation of the catalyst components during reaction which leads to decrease in production through increase in pressure drop of the catalyst bed to passage therethrough of a gaseous reaction mixture and to decrease in yield and quality of phthalic anhydride through lowering of selectivity, to shorten the life of the catalyst.

The $V_2O_5$-$TiO_2$ catalyst disclosed in Japanese Patent Open No. 5661/1972 also can not be said to be an industrially advantageous catalyst having a long life because it is prepared by glazing a carrier with a silicic enamel consisting essentially of $SiO_2$, $Al_2O_3$, CaO, MgO, BaO, $K_2O$-$Na_2O$ and $B_2O_3$ and supporting a $V_2O_5$-$TiO_2$ on the glazed non-porous carrier and, therefore, there is a possibility to contaminate the catalyst by the silicic enamel scraped from the surface of the glazed carrier during the preparation of the supported catalyst to make the catalyst composition non-uniform and, thereby, to lower the selectivity and a possibility to contaminate the catalyst composition by one or more components of the silicic enamel substance on the surface of the glazed carrier, especially alkali and alkaline earth metals thermally immigrated in the catalyst composition during the use of the catalyst at high temperature for a long period of time to lower the selectivity of the catalyst in prolonged operation.

Accordingly, it is an object of the present invention to provide an improved catalyst for the preparation of phthalic anhydride.

Another object of the present invention is to provide a catalyst for the preparation of phthalic anhydride which is stable in industrial use and capable of giving a high level of yield for a long period of time.

SUMMARY OF THE INVENTION

In accordance with the present invention, a catalyst for the preparation of phthalic anhydride by vapor phase catalytic oxidation of either ortho-xylene or haphthalene with a molecular oxygen-containing gas, comprises a catalytic substance comprising 1 to 20 parts by weight of $V_2O_5$ and, correspondingly, 99 to 80 parts by weight of $TiO_2$ incorporated with, based on the total weight of the $V_2O_5$-$TiO_2$ mixture, 0.02 to 5.0 % by weight of $Nb_2O_5$, 0.1 to 5.0 % by weight of $P_2O_5$, 0 to 0.25 % by weight of $K_2O$, 0 to 0.5 % by weight of $Cs_2O$, the total weight of $K_2O$ and $Cs_2O$ being at least 0.05 % by weight, and 0 to 5.0 % by weight of at least one member selected from the group consisting of oxides of rare earth elements, ZnO and $Tl_2O$, said catalytic substance being supported on a porous inert carrier.

To say, we have found that a catalyst comprising in addition to $V_2O_5$-$TiO_2$, $Nb_2O_5$, $P_2O_5$, $K_2O$ and $Cs_2O$ and, optionally, oxides of rare earth elements (oxide of an element of the atomic number of 21, 39 and 57 to 71 in the Periodic Table), ZnO or $Tl_2O$ exhibits a good yield of phthalic anhydride and that the additives, other than the $V_2O_5$ and $TiO_2$, not only contribute to enhancement of yield as active components in the catalyst but also play a regulative role for the properties and structure of the catalyst.

We have made an additional discovery that the yield of phthalic anhydride varies to a great extend depending on the process for the preparation of the $TiO_2$ employed as a component of the catalyst of the present invention, especially in supported catalysts.

DETAILED DESCRIPTION

In general, the $TiO_2$ suitably used as a component of catalysts may be prepared by:
1. digesting and hydrolyzing a titanium ore, such as illumenite, or titanium sludge with sulfuric acid and calcining the resulting metatitanic acid (Sulfuric acid process),
2. vapor phase oxidative decomposition of titanium tetrachloride (Chlorine process),
3. pyrolysis of ammonium titanyl sulfate $(NH_4)_2SO_4$-$TiOSO_4.H_2O$ derived from titanium tetrachloride, ammonium sulfate and sulfuric acid (Pyrolysis process), or
4. hydrolysis of titanium tetrachloride, titanium nitrate or organic titanates (Hydrolysis process), and, among these, commercially widely adopted are the process (1) to (3), especially the sulfuric acid process (1). In the sulfuric acid process it is difficult to obtain $TiO_2$ of a high purity because of unavoidable contamination by impurities derived from an ore used as starting material, but in the chlorine process, pyrolysis process and hydrolysis process there is advantageously obtained $TiO_2$ of high purity because of ease of purification of a starting material. And, we have found that the catalytic activity of the catalyst prepared by using a $TiO_2$ obtained in the sulfuric acid process and, consequently, the yield of phthalic anhydride obtained by use of the catalyst are varied within wide ranges depending on the kinds and contents of impurities contained. On the other hand, a catalyst prepared by using $TiO_2$ of a high purity gives a low yield of phthalic anhydride and, especially, a catalyst consisting of $V_2O_5$-$TiO_2$ alone wherein the $TiO_2$ is prepared by either one of the aforesaid process (2) to (4) gives a very low yield of phthalic anhydride.

As the result of invenstigations on supported catalysts capable of obtaining phthalic anhydride in a high yield at a high space velocity on the basis of these discoveries, we have found out that the catalytic activity of a $V_2O_5$-$TiO_2$ catalyst prepared by using $TiO_2$ of a high purity is promoted to a great extent by incorporating therein in appropriate amounts of $Nb_2O_5$, $P_2O_5$ and at least one member of the group consisting of $K_2O$ and $Cs_2O$ and a further improvement in quality of phthalic anhydride is attained by incorporating in the aforesaid catalyst an appropriate amount of at least one member of the group consisting of oxides of rare earth elements, ZnO and $Tl_2O$ to minimize the yields of by-products, such as phthalide and benzoic acid in case where is used ortho-xylene as starting material or naphthoquinone in case where is used naphthalene as starting material, which have special adverse effects as impurities on the quality of phthalic anhydride and, thereby, to minimize the production loss during purification.

The catalysts of a high catalytic activity are obtainable also from commercially available $TiO_2$ for pigment use and industrial use by pretreating the $TiO_2$ in the form of slurry with ion-exchange resins to eliminate therefrom soluble ions or washing it with acid and/or aqueous alkali or pure water to adjust its contents of impurities and incorporating in the so treated $TiO_2$ appropriate amounts of $V_2O_5$, $Nb_2O_5$ $P_2O_5$, $K_2O$, $Cs_2O$, oxides of rare earth elements, especially of Y, La, Nd, Gd, Tb, Ho or Er, ZnO and $Tl_2O$.

The $V_2O_5$, $Nb_2O_5$, $P_2O_5$, $K_2O$, $Cs_2O$, oxides of rare earth elements, ZnO and $Tl_2O$, used in the catalyst of the present invention may adequately chosen from oxides, ammonium salts, nitrates, sulfates, halides, hydroxides, organic acid salts and other compounds derived from such elements. That is to say, the components of the catalysts of the present invention are not restricted to the oxides as described in this specification, which indicate merely the compositions of integral constituents in the finished catalyst.

The catalyst of the present invention is of the composition comprising 1 to 20 parts by weight of $V_2O_5$ and, correspondingly, 99 to 80 parts by weight of $TiO_2$ and, based on the total weight of the $V_2O_5$ and $TiO_2$, 0.02 to 5.0 % by weight of $Nb_2O_5$, 0.1 to 5.0 % by weight of $P_2O_5$, 0 to 0.25 % by weight of $K_2O$, 0 to 0.5 % by weight of $Cs_2O$, the total amount of $K_2O$ and $Cs_2O$ being at least 0.05 % by weight, and, optionally, 0 to 5.0 % by weight of at least one member selected from the group consisting of oxides of rare earth elements (the atomic number 21, 39 and 57 to 71), ZnO and $Tl_2O$.

The term "rare earth element" used in this specification means scandium Sc of atomic number 21, yttrium Y of atomic number 39 and lanthanum La, cerium Ce, praseodymium Pr, neodymium Nd, promethium Pm, samarium Sm, europium Eu, gadolinium Gd, terbium Tb, dysprosium Dy, holmium Ho, erbium Er, thulium Tm, ytterbium Yb and lutetium Lu of atomic numbers 57 to 71, and preferably used are Y, La, Nd, Gd, Tb, Ho and Er.

In detailed investigations on the catalyst of the present invention, there has been found that the diameter, distribution and total volume of pores and other characteristics of of the catalyst varies depending on the properties of $TiO_2$ and the contents of $Nd_2O_5$, $P_2O_5$, $K_2O$ and $Cs_2O$, changes of those parameters have great influences on the yield of phthalic anhydride and the nature of a carrier also has great influences, namely, special carriers bring about excellent results.

In the catalyst of the present invention, $\alpha$-alumina and molded $\alpha$-alumina which have hitherto been widely used as carriers for catalysts for the preparation of phthalic anhydride result in a remarkable decrease in yield of phthalic anhydride and an aluminum compound contained in a binder to be used in molded carriers also has an undesirable effect on the catalytic activity as well as the $\alpha$-alumina. Therefore, it is preferred to use as the carrier for the preparation of the catalyst in accordance with the present invention porous solids of a high silicon carbide SiC content and of an apparent porosity (apparent porosity will hereinafter be referred to as merely "porosity".) of at least 10 % which contain aluminum compound in an amount of at most 10% by weight, preferably at most 5 % by weight as $Al_2O_3$ and SiC in an amount of at least 50 %, preferably at least 80 % by weight. The carrier substances which satisfy the aforesaid conditions is exemplified a SiC sintered (self-bonded) carrier (SiC-SB) of a SiC content of at least 98 % and of a porosity of 25 to 40 %. This carrier, when used for the preparation of a supported catalyst of the present invention, gives a very high yield of phthalic anhydride since it contains substantially no $Al_2O_3$ and, in addition, provides a supported catalyst of an improved stability and having a high activity and a high selectivity because of a high porosity of 25 to 40 % which ensures adhesion of catalytic components of the carrier and prevents abrasion or exfoliation of the catalytic components of the carrier as seen in case of nonporous carriers, without requiring any special device for the preparation of the supported catalyst. The catalyst thus formed is substantially free from abrasion of catalytic components caused by physical or mechanical shock imposed thereto during transportation and feeding into an oxidation reactor and free from increase in pressure drop in the catalyst bed over a long reaction time and, thus, makes it possible to retain a high productivity for a long period of time.

A more important feature of the carrier substance which makes it very advantageous as a carrier for the catalyst of the present invention is that the carrier substance is of a high purity of SiC and substantially contains no alkali metals and like impurities, which may diffuse into a catalyst composition and affect the composition of the catalyst which has been adjusted to the optimum, so that the catalyst containing such carrier substance gives a high yield for a surprisingly long period of time without deterioration in catalytic activity during prolonged operation. Other than the such SiC sintered carrier, molded SiC carriers having a SiC content of at least 50 % by weight, desirably at least 80 % by weight and an $Al_2O_3$ content of at most 10 % by weight, desirably at most 5 % by weight and of a porosity of at least 10 %, desirably 15 to 40 %, prepared by calcining SiC using a binder, such as aluminum silicate, are also suitably used to obtain a similar result.

In general, the $TiO_2$ has two crystal forms: anatase and rutile, preferred in the practice of the present invention is $TiO_2$ in anatase form. In all the aforesaid processes for the preparation of $TiO_2$, $TiO_2$ is obtained through a calcination step at a temperature of about 600°C or more and, in this step, there occurs aggregation or sintering of primary particles of $TiO_2$ and, occasionally, transformation from anatase to rutile. The size of primary particles of $TiO_2$ varies depending on the preparing process, for instance, in case of anatase, it ranges from 0.1 to 0.6 micron, and, with the particle size, the surface area of $TiO_2$ also varies within a wide range.

Although the surface area of $TiO_2$ is not critical in the present invention, those having surface areas of 5 to 35 $m^2/g$ usually bring about a good result. The surface area is inversely proportional to the size of primary particle, and the surface area and other properties of $TiO_2$ as a raw material of the catalyst relates with the optimum amounts of $Nb_2O_5$, $P_2O_5$, $K_2O$, $Cs_2O$ and other additives, e.g. the optimum amounts of such additives increase with the surface area of $TiO_2$, and have influences of such properties of the resulting catalyst as, e.g., the diameter, distribution and total volume of pores. Accordingly, it is necessary to prepare the catalyst with the greatest care, as mentioned hereinafter.

Commercially available $TiO_2$ is in general classified into special reagent grade, first reagent grade, chemical grade and pigment $TiO_2$. It is inadequate to use the commercially available $TiO_2$ as it is as a component of the catalyst of the present invention because most of $TiO_2$, except some special reagent grade $TiO_2$, contain various impurities originating from raw ores or various additives incorporated therein as to impart certain pigment characteristics. However, the commercially available $TiO_2$ is conveniently used as a component of the catalyst of the present invention after elimination or adjustment of impurities contained therein by a suitable pretreatment as mentioned above. Thus, in the practice of the present invention, there may be used any $TiO_2$ as prepared in the aforesaid processes.

Although commercially available $TiO_2$ occasionally contains traces of compounds of iron, silicon, zinc, aluminum, manganese, chromium, niobium, antimony, lead, calcium, potassium, phosphorus and other elements, it is conveniently used as a raw material of the catalyst of the present invention since such impurities have no undesirable effect on catalytic activity so long as the total amount of such impurities other than compounds of niobium, phosphorus, potassium, cesium, zinc, thallium and rare earth elements, calculated as oxides, does not exceed 0.5 % by weight of $TiO_2$. Of course, it is desirable that the contents of such impurities are as low as possible.

The catalyst in accordance with the present invention is preferably prepared by dispersing a selected, pretreated, finely divided $TiO_2$ in an aqueous, oxalic acid-containing aqueous or hydrochloric acid-containing aqueous solution containing vanadium, niobium, phosphorus and potassium and/ or cesium and, optionally, rare earth elements, zinc or thallium to form a slurry, supporting the catalytic substance in the form of a slurry on a preheated carrier and calcining the supported catalyst at a temperature of 300° to 600°C, preferably 500° to 550°C for several hours in an oxidative atmosphere, e.g. in a stream of air. Although the weight of the catalytic substance to be supported on the carrier varies depending on the specific gravity, shape, size and other properties of the carrier, in case of a carrier of a particle size of 3 to 10 mm, it is preferred to support 3 to 15 g of the catalytic substance per 100 cc of the carrier.

The homogeneity of mixture of the $TiO_2$ and other catalytic components in the slurry and the solid content of the slurry control the distribution of pores and total pore volume of the resulting supported catalyst. It seems that the average pore diameter and total pore volume increase with increase of the homogeneity and solid content. The slurry concentration or solid content of the slurry should be so determined considering the properties of a $TiO_2$ used as to provide a supported catalyst in which the total volume of pores of sizes of 0.10 to 0.45 micron amounts to at least 50 %, preferably at least 80 % of the total volume of pores of sizes of less than 10 microns in the catalytically active substance layer in the finished supported catalyst.

In usual, a supported catalyst having a total volume of pores of sizes of 10 microns or less in its catalytic layer of 0.2 to 1.5 cc/g-catalytic layer and vividly exhibiting advantages brought about by the present invention is obtained by supporting the aforesaid weight of catalytic layer on a support from a $TiO_2$ slurry containing 100 g of $TiO_2$ per 300 to 650 cc of the solution of other catalytic components.

Using the catalyst in accordance with the present invention there is obtained phthalic anhydride in a very high yield of 112 to 118 % by weight from ortho-xylene under the reaction conditions of: reaction temperature of 330° to 420°C, preferably 350° to 400°C; xylene concentration of 15 to 40, preferably 20 to 30 1-air/g-xylene; and space velocity of 2,000 to 8,000, preferably 3,000 to 6,000 $hr^{-1}$. From naphthalene is obtained phthalic anhydride in a yield of 96 to 102 % by weight under the reaction conditions of: temperature of 380° to 440°, preferably 400° to 420°C; naphthalene concentration of 20 to 40, preferably 25 to 30 1-air/g-naphthalene; and space velocity of 2,000 to 6,000, preferably 3,000 to 5,000 $hr^{-1}$.

In use of the catalyst of the present invention in a reaction tube, the packing region of the reaction tube may be divided into two or more sections to pack the first section with a catalyst of a relatively low activity or a following section with a catalyst of a relatively high high activity within the composition range of the catalyst of the present invention.

In the following Examples and Comparative Examples, all yields were calculated by the following formula:

$$\frac{\text{weight of product}}{\text{weight of ortho-xylene or naphthalene}} \times 100$$

EXAMPLE 1

To water there was added dropwise 5,700 g of $TiCl_4$ of special reagent grade to form a 60 % aqueous solution, then stirred therein 2,940 g of sulfuric acid of special reagent grade. On the other hand, there was prepared a saturated aqueous solution containing 3,940 g of ammonium sulfate of special reagent grade and heated at 100°C and the saturated solution was stirred into the $TiCl_4$-$H_2SO_4$ aqueous solution. The mixed solution was then allowed to stand still to precipitate ammonium titanyl sulfate $(NH_4)_2SO_4 \cdot TiOSO_4 \cdot$ -

H₂O. The precipitate was filtered and calcined at 750°C for 10 hours to obtain 2,300 g of powdered $TiO_2$ by thermal decomposition of the ammonium titanyl sulfate.

In 6,400 cc of deionized water there was dissolved 100 g oxalic acid to form an aqueous oxalic acid solution. The solution was then added with a solution of 50 g of ammonium vanadate, 14.6 g of monoammonium dihydrogen phosphate, 3.2 g of potassium hydroxide and 9.1 g of niobium chloride in an aqueous hydrochloric acid and thoroughly stirred. To the aqueous solution containing vanadium, phosphorus, potassium and niobium there was added 1,800 g of the aforesaid powdered $TiO_2$ and the mixture was stirred for 30 minutes to form a slurry of a catalytic substance. In an externally heatable stainless steel rotary furnace of a diameter of 35 cm and a length of 80 cm there was charged 2,000 cc of an irregularly shaped SiC carrier of an average particle size of 7 to 8 mm, of an apparent porosity of 18 % and a SiC content of 98.5 % which was then preheated at 200° to 250°C. With rotating the rotary furnace, there was sprayed on the carrier the aforesaid slurry until 160 g of the catalyst substance was deposited on the carrier and, subsequently, the content in the furnace was calcined at 530°C for 10 hours with passing therethrough air to obtain a supported catalyst containing $V_2O_5$ and $TiO_2$ in a weight ratio of 2.1: 97.9 and, based on the total weight of the $V_2O_5$ and $TiO_2$, 0.49 % by weight of $P_2O_5$, 0.146 % by weight of $K_2O$ and 0.25 % by weight of $Nb_2O_5$.

The distribution of pores in the catalyst thus prepared was determined by means of a mercury porosimeter (Winslow Porosimeter, Aminco). The volume of pores of diameters of 0.10 – 0.45 micron amounted to 86 % of the total volume of pores of diameters of less than 10 microns and the distribution of pores was as shown in the graph in the accompanying drawing. This will hereinafter be referred, for short, to as "the volume of pores 0.10 to 0.45 micron was 86 %.". A stainless reaction tube of an inner diameter of 25 mm immersed in a fused salt bath at a temperature of 370°C (hereinafter the fused salt bath temperature will be referred, for short, to as N.T.) was packed with 1200 cc of the catalyst thus obtained and passed therethrough a gaseous mixture of an ortho-xylene concentration of 27 1-air/g-xylene at a space velocity (hereinafter referred to as "S.V.") of 4,000 $hr^{-1}$ to oxidize an ortho-xylene of a purity of 99 %, thereby, to obtain phthalic anhydride in a yield of 116.6 % by weight and maleic anhydride in a yield of 5.9 % by weight. These values, calculating to an 100 % orthoxylene base, became 117.7 % by weight and 6.0 % by weight, respectively.

The concentration of ortho-xylene in gaseous reaction mixture in the following Examples 2 to 10 and Comparative Examples was 27 1-air/g-xylene.

EXAMPLES 2 to 4

A catalyst was prepared in a similar way as in Example 1 using cesium sulfate in addition to the reagents used in Example 1, and a 99 % ortho-xylene was oxidized in a similar procedure as in Example 1 under the conditions as listed in the following Table 1 to obtain the results as summarized in the Table 1.

The concentration of catalytically active substance in the catalyst was 160 g-catalytically active substance/2,000 cc-catalyst.

TABLE 1

| Example No. | $V_2O_5:TiO_2$ (wt. ratio) | Composition of Catalyst Amounts of additives, wt.% based on $(V_2O_5+TiO_2)$ | | | |
|---|---|---|---|---|---|
| | | $Nb_2O_5$ | $P_2O_5$ | $K_2O$ | $Cs_2O$ |
| 2 | 2.9:97.1 | 0.388 | 0.388 | — | 0.29 |
| 3 | 7.4:92.6 | 0.185 | 0.274 | 0.093 | 0.185 |
| 4 | 13.8:86.2 | 0.69 | 0.474 | 0.172 | — |

| Carrier | Volume of pores of 0.10 to 0.45 micron | Reaction conditions | | Yield (wt.%) | |
|---|---|---|---|---|---|
| | | N.T. | S.V. | Phthalic anhydride | Maleic anhydride |
| | | (°C) | $(hr^{-1})$ | | |
| 6–8 mm SiC | 81 % | 380 | 3,000 | 116.5 | 6.0 |
| 7mm φ sintered SiC | 86 % | 390 | 4,000 | 115.8 | 5.8 |
| 6mm φ molded SiC | 83 % | 390 | 3,000 | 115.5 | 5.5 |

The chemical compositions and porosities of the carriers used in these Examples were as summarized in the following Table 2.

Table 2

| Example No. | Carriers | SiC content | $Al_2O_3$ content | Porosity |
|---|---|---|---|---|
| 2 | 6–8 mm SiC irregular | 98 % | — | 17–19 % |
| 3 | 7 mm φ SiC sintered | 97 % | — | 30–35 % |
| 4 | 6 mm φ SiC molded | 84 % | 3.0 % | 40–45 % |

COMPARATIVE EXAMPLES 1 to 5

Catalysts of the same composition with that employed in Example 1 except that they lacked some or all of phosphorus, potassium and niobium were prepared in the same way as in Example 1 and a 99 % ortho-xylene was oxidized in the same manner as in Example 1 using such a catalyst. The results obtained were summarized in the following Table 3. The carrier used was SiC irregular of particle sizes of 6 – 8 mm.

Table 3

| Comparative Example No. | $V_2O_5:TiO_2$ (wt. ratio) | Composition of catalyst Amounts of additives, based on $(V_2O_5+TiO_2)$ | | |
|---|---|---|---|---|
| | | $Nb_2O_5$ | $P_2O_5$ | $K_2O$ (wt.%) |
| 1 | 7.4:92.6 | — | — | — |
| 2 | 16.7:83.3 | — | — | — |
| 3 | 4.8:95.2 | — | 0.476 | 0.095 |
| 4 | 4.8:95.2 | 0.285 | 0.476 | — |
| 5 | 2.9:97.1 | 0.194 | — | 0.194 |

| Reaction conditions | | Yield (wt.%) | |
|---|---|---|---|
| N.T. (°C) | S.V. ($hr^{-1}$) | Phthalic anhydride | Maleic anhydride |
| 350 | 4,000 | 82.5 | 9.6 |
| 360 | 3,000 | 89.0 | 9.0 |
| 380 | 4,000 | 98.6 | 7.8 |
| 370 | 3,000 | 99.7 | 6.9 |
| 370 | 4,000 | 91.6 | 8.2 |

COMPARATIVE EXAMPLE 6

A catalyst was prepared using the same carrier and in the same procedure as in Example 1 except that there was used a $TiO_2$ obtained by hydrolysis of $TiCl_4$ in hot aqueous solution in place of the $TiO_2$ obtained by pyrolysis of ammonium titanyl sulfate. The volume of pores of 0.10 to 0.45 micron in the catalyst thus obtained was 33 % of the total volume of pores of less than 10 microns. When a 99 % ortho-xylene was oxidized using this catalyst in the same procedure as in Example 1, the yield of phthalic anhydride was only 100.1 % by weight.

EXAMPLE 5

As in Comparative Example 6, a catalyst was prepared using a similar procedure as in Example 1 except that there was used a mixture of 60 % by weight of $TiO_2$ obtained by pyrolysis of ammonium titanyl sulfate and 40 % by weight of $TiO_2$ obtained by hydrolysis of $TiCl_4$ as the $TiO_2$.

The volume of pores of 0.10 to 0.45 micron in the catalyst thus obtained increased to 68 % of the total volume of pores of less than 10 microns. Ortho-xylene of a purity of 99 % was oxidized in a similar procedure as in Example 1 at N.T. of 380°C, S.V. of 3,000 $hr^{-1}$ and ortho-xylene concentration of 27 1-air/g-xylene to obtain phthalic anhydride in a yield of 112.0 % by weight and maleic anhydride in a yield of 6.9 % by weight as a by-product. Further, naphthalene of a purity of 97 % was oxidized under reaction conditions of N.T. of 410°C, S.V. of 3,000 $hr^{-1}$ and naphthalene concentration of 30 1-air/g-naphthalene to obtain phthalic anhydride in a yield of 100.1 % by weight and naphthoquinone in a yield of 3.9 % by weight as a by-product.

EXAMPLE 6

To 1,800 g of $TiO_2$ as obtained in Example 1 there were added drop-wise an aqueous solution containing 13.5 g of ammonium dihydrogen phosphate and 3.2 g of potassium hydroxide and an aqueous hydrochloric acid solution containing 7.3 g of niobium chloride, the mixture was thoroughly stirred. The mixture was then calcined at 800°C for 5 hours in air stream. In 6,400 cc of deionized water there was dissolved 150 g of oxalic acid and then 70 g of ammonium vanadate. To the solution was added the aforesaid $TiO_2$ containing phosphorus, potassium and niobium and the mixture was stirred for 30 minutes to form a catalyst slurry. The catalyst slurry was supported on a sintered SiC carrier of 7mm $\phi$ × 7mm length and an apparent porosity of 35 % (SiC content 99 %) and calcined at 550°C for 6 hours to obtain a supported catalyst containing 150 g of a catalytically active substance per 2,000 cc. The catalyst thus obtained contained $V_2O_5$ and $TiO_2$ in the weight ratio of 2.9:97.1 and, based on the total weight of $V_2O_5$ and $TiO_2$, 0.447 % by weight of $P_2O_5$, 0.146 % by weight of $K_2O$ and 0.194 % by weight of $Nb_2O_5$.

The volume of pores of 0.10 to 0.45 micron in the catalyst thus obtained was 89 %. A 25 mm $\phi$ stainless steel reaction tube was packed with 1,200 cc of the catalyst and 99 % ortho-xylene was oxidized therethrough under the reaction conditions of N.T. of 390°C and S.V. of 3,500 $hr^{-1}$ to obtain phthalic anhydride in a yield of 117.1 % by weight and maleic anhydride in a yield of 5.3 % by weight. When 97 % naphthalene derived from tar was oxidized in this reaction tube at a concentration of 30 1-air/g-naphthalene, at N.T. of 420°C and at S.V. of 3,000 $hr^{-1}$, there was obtained phthalic anhydride in a yield of 101.5 % by weight.

EXAMPLE 7

In 10 liters of deionized water there was dispersed 1,800 g of anatase $TiO_2$ for pigment, then added thereto 200 cc of an anion exchange resin. After stirred for 30 minutes, the anion exchange resin was removed. The dispersion was then stirred for 30 minutes with 200 cc of a cation exchange resin added thereto. After removal of the cation exchange resin, the aqueous $TiO_2$ dispersion thus deionized was concentrated under reduced pressure on a water bath at 80°C to dryness and then calcined at 500°C for 6 hours to obtain a $TiO_2$ of a surface area of 9.0 $m^2$/g containing 0.38 % by weight of $P_2O_5$, 0.03 % by weight of $K_2O$ and 0.16 % by weight of $Nb_2O_5$. A catalyst slurry was prepared in a similar procedure as in Example 1 from the $TiO_2$ and phosphoric acid, potassium carbonate, ammonium vanadate and niobium chloride in amounts corresponding to, based on the weight of the $TiO_2$, 0.16 % by weight of $P_2O_5$, 0.05 % by weight of $K_2O$, 3.0 % by weight of $V_2O_5$ and 0.25 % by weight of $Nb_2O_5$. Using this slurry, 160 g of catalyst substance was supported in a similar procedure as in Example 1 on 2,000 cc of a sintered SiC carrier of 5 mm $\phi$ × 5 mm length and of a porosity of 35 %. The supported catalyst thus prepared was then calcined in air stream at 530°C for 10 hours to obtain an active supported catalyst of a volume of pores of 0.10 to 0.45 micron of 89 % and containing $V_2O_5$ and $TiO_2$ in a weight ratio of 2.9:97.1 and, based on the total weight of $V_2O_5$ and $TiO_2$, $Nb_2O_5$ 0.40 % by weight, $P_2O_5$ 0.524 % by weight and $K_2O$ 0.078 % by weight. 99% ortho-xylene was oxidized using 1,600 cc of the supported catalyst at N.T. of 380°C and S.V. of 4,300 hr$^{-1}$ to obtain phthalic anhydride in a yield of 115.1 % by weight and maleic anhydride in a yield of 5.9 % by weight.

COMPARATIVE EXAMPLE 7

A slurry of catalyst substance was prepared using $TiO_2$ for pigment containing 0.63 % by weight of $P_2O_5$, 0.28 % by weight of $K_2O$ and 0.01 % by weight of $Nb_2O_5$ and having a surface area of 7.2 m²/g and ammonium vanadate in an amount corresponding to 3.0 % by weight of $V_2O_5$ based on the weight of the $TiO_2$ and a supported catalyst was prepared from the slurry in a similar procedure as in Example 7. When ortho-xylene was oxidized in vapor phase using the supported catalyst thus obtained, the maximum yield was obtained under reaction conditions of a reaction temperature of 440°C and of S.V. of 2,000 hr$^{-1}$, the yield of phthalic anhydride was only 68.0 % by weight.

COMPARATIVE EXAMPLE 8

A catalyst slurry was prepared from the $TiO_2$ after the deionizing treatment as in Example 7 and ammonium vanadate in an amount corresponding to 3.0 % by weight of $V_2O_5$, based on the weight of the $TiO_2$ and a supported catalyst was prepared from the slurry in a similar procedure as in Example 7.

Ortho-xylene was oxidized using the supported catalyst thus obtained under the reaction conditions of N.T. of 370°C and S.V. of 3,000 hr$^{-1}$ to obtain phthalic anhydride in a yield of 98.5 % by weight and maleic anhydride in a yield of 8.4 %.

EXAMPLE 8 TO 9 AND COMPARATIVE EXAMPLE 9

In the same procedure as in Example 7, catalysts differing in contents of $Nb_2O_5$, $P_2O_5$, $K_2O$ and $Cs_2O$ from that in Example 7 were prepared using $TiO_2$ for pigment and, using the catalysts, 99 % ortho-xylene was oxidized in the same manner as in Example 7. The carrier used was 7 mm $\phi$ sintered SiC carrier of an apparent porosity of 34 %. For comparison, a catalyst containing $K_2O$ in an amount below the lower limit for the catalyst of the present invention was prepared and used for the oxidation. The results were summarized in the following Table 4.

6 – 8 mm $\phi$ ($Al_2O_3$ 99 %) carrier or molded $\alpha$-$Al_2O_3$ ($Al_2O_3$ 87 %, $SiO_2$ 11.7 %) carrier and using the catalysts thus obtained was oxidized 99 % ortho-xylene at N.T. of 360° to 380°C and S.V. of 3,000 hr$^{-1}$ to obtain phthalic anhydride in a yield, in case of the fused $\alpha$-alumina carrier, of 94 % by weight or, in case of the molded $\alpha$-alumina carrier, of 91 % by weight.

COMPARATIVE EXAMPLE 11

A supported catalyst was prepared in the same procedure as in Example 7 except for use of a smooth-surfaced, non-porous fused aluminium silicate carrier ($Al_2O_3$ 30 %, $SiO_2$ 70 %) and 99 % ortho-xylene was oxidized using the catalyst at N.T. of 380°C and at S.V. of 3,000 hr$^{-1}$ to obtain phthalic anhydride in a yield of only 101.5 % by weight.

EXAMPLE 10

Strength test was made on the supported catalyst obtained in Example 7 and in Comparative Example 11 in the following procedure.

In a stainless steel container of a diameter of 45 mm and a volume of 180 cc there was charged 50 cc of a supported catalyst containing 8 g of a catalyst substance per 100 cc of carrier. The container was then shaken 60 times at an amplitude of oscilation of 40 mm and the dust of the catalyst substance broken off from the support or carrier was weighed. The weight of the dust was, in case of the supported catalyst in which the carrier was the sintered porous SiC carrier, 0.12 to 0.20 g, while, on the other hand, in case of the smooth-surfaced, non-porous aluminium silicate carrier, the weight was as large as 2.5 to 3 g and most of particles of the supported catalyst exposed the surfaces of particles of the carrier.

EXAMPLE 11

An aqueous oxalic acid solution was prepared by dissolving 100 g of oxalic acid in 6,400 cc of deionized water, then stirred thereinto an aqueous hydrochloric acid solution containing 50 g of ammonium vanadate, 14.6 g of ammonium dihydrogen phosphate, 3.2 g of potassium hydroxide and 9.1 g of niobium chloride and 1.42 g of gadolinium nitrate. To the aqueous solution containing phosphorus, niobium potassium, vanadium and gadolinium thus obtained there was added 1,800 g of $TiO_2$ prepared in the manner as in Example 1 and the mixture was stirred for 30 minutes to obtain a catalyst slurry. In an externally heated stainless steel rotary Table 4

| Example No. | Composition of catalyst | | | | |
|---|---|---|---|---|---|
| | $V_2O_5$:$TiO_2$ (wt. ratio) | Amounts of additives, based on ($V_2O_5$+$TiO_2$) | | | |
| | | $Nb_2O_5$ | $P_2O_5$ | $K_2O$ | $Cs_2O$ (wt.%) |
| 8 | 4.7:95.3 | 0.19 | 0.476 | 0.076 | — |
| 9 | 7.4:92.6 | 0.37 | 0.556 | 0.064 | 0.046 |
| Comp. 9 | 4.7:95.3 | 0.19 | 0.476 | 0.033 | — |

| Reaction conditions | | Yield (wt.%) | |
|---|---|---|---|
| N.T. (°C) | S.V. (hr$^{-1}$) | Phthalic anhydride | Maleic anhydride |
| 390 | 3,500 | 115.9 | 6.1 |
| 395 | 3,000 | 116.2 | 5.3 |
| 390 | 3,000 | 99.8 | 8.0 |

COMPARATIVE EXAMPLE 10

Catalysts were prepared in the same procedure as in Example 7 except that there was used fused $\alpha$-$Al_2O_3$ of furnace of a diameter of 35 cm and a length of 80 cm there was charged 2,000 cc of a SiC carrier of a representative particle size of 5 to 7 mm and an apparent porosity of 18 % (SiC content 98.5 %) and was preheated to 200 to 250°C. With revolving the rotary furnace, there was sprayed the aforesaid slurry until 180 g of the catalyst substance was supported on the carrier which was then calcined at 530°C for 10 hours with passing therethrough air. The supported catalyst thus obtained contained $V_2O_5$ and $TiO_2$ and a weight ratio of 2.1:97.9 and, based on the total weight of the $V_2O_5$ and $TiO_2$, 0.49 % by weight of $P_2O_5$, 0.146 % by weight of $K_2O$, 0.244 % by weight of $Nb_2O_5$ and 0.04 % by weight of $Gd_2O_3$. When determined by means of a mercury porosimeter, the volume of pores of 0.10 to 0.45 micron was 85 %.

A 25 mm $\phi$ stainless steel reaction tube maintained at N.T. of 370°C was packed with 1,200 cc of the catalyst thus obtained and 99 % ortho-xylene was oxidized therein under reaction conditions of S.V. of 4,000 hr$^{-1}$ and ortho-xylene concentration of 25 1-air/g-xylene to obtain phthalic anhydride in a yield of 115.2 % by weight, said phthalic anhydride containing as impurities 0.01 5 of phthalide and 0.015 % of benzoic acid.

EXAMPLE 12

A slurry of a catalyst substance was prepared using anatase $TiO_2$ for pigment which has been deionized in a similar manner as in Example 7 and ammonium vanadate, phosphoric acid, potassium carbonate, cesium sulfate, niobium chloride and terbium nitrate in amounts corresponding to, based on the weight of the $TiO_2$ 3 % by weight of $V_2O_5$, 0.20 % by weight of $P_2O_5$, 0.05 % by weight of $K_2O$, 0.1 % by weight of $Cs_2O$, 0.25 % by weight of $Nb_2O_5$ and 0.05 % by weight of $Tb_4O_7$, respectively. A catalyst was prepared in a similar procedure as in Example 1 using a sintered SiC carrier of a particle size of 6 mm $\phi$ × 6 mm length and an apparent porosity of 37 % (SiC content, 99 % or more). The volume of pores of 0.10 to 0.45 micron of the supported catalyst thus obtained was 92 %.

Using 1,600 cc of the supported catalyst thus obtained, ortho-xylene of a purity of 99 % was oxidized under reaction conditions of N.T. of 375°C, S.V. of 4,500 hr$^{-1}$ and xylene concentration of 25 1-air/g-xylene to obtain phthalic anhydride in a yield of 115.0 % by weight. The phthalic anhydride contained as impurities 0.01 % of phthalide and 0.02 % of benzoic acid.

EXAMPLES 13 TO 15

The procedure as in Example 12 was repeated using various catalyst of the compositions as indicated in the following Table 5 to obtain the results as summarized in the Table 5.

Table 5

| Example No. | $V_2O_5$:$TiO_2$ (wt. ratio) | Composition of catalyst Amounts of additives (wt.%), based on ($V_2O_5$+TiO) | | | | | |
|---|---|---|---|---|---|---|---|
| | | $Nb_2O_5$ | $P_2O_5$ | $K_2O$ | $Cs_2O$ | Others | |
| 13 | 3:97 | 0.5 | 0.5 | 0.07 | — | ZnO | 0.6 |
| 14 | 5:95 | 0.45 | 0.6 | 0.08 | — | $Nd_2O_3$, $Tb_4O_7$ | 0.03, 0.05 |
| 15 | 3:97 | 0.5 | 0.63 | 0.09 | — | $Tl_2O$, $Er_2O_3$ | 0.1, 0.04 |

| Carrier | Conditions (°C) | (hr$^{-1}$) | (l/g) | Yield of (wt.%) phthalic anhydride |
|---|---|---|---|---|
| 5–7 mm $\phi$ SiC irregular | 390 | 3,000 | 25 | 114.5 |
| 6 mm $\phi$ SiC molded | 375 | 5,000 | 25 | 115.1 |
| 6 mm $\phi$ × 6 mm SiC sintered | 385 | 4,000 | 25 | 116.0 |

| Impurities (%) in phthalic anhydride | |
|---|---|
| Phthalide | Benzoic acid |
| 0.01 | 0.02 |
| 0.01 | 0.01 |
| 0.015 | 0.02 |

The chemical compositions and porosities of the carriers used in these examples were as indicated in the following Table 6.

Table 6

| Carrier | SiC content | $Al_2O_3$ content | Apparent porosity |
|---|---|---|---|
| 5–7 mm SiC irregular | 98 % | — | 17–19 % |
| 6 × 6 mm SiC sintered | 99 % | — | 30–37 % |
| 6 mm SiC molded | 84 % | 3.0 % | 40–45 % |

EXAMPLE 16

A catalytically active substance containing $V_2O_5$ and $TiO_2$ in the weight ratio of 5:95 and, based on the total weight of the $V_2O_5$ and $TiO_2$, 0.6 % by weight of $P_2O_5$, 0.15 % by weight of $K_2O$, 0.4 % by weight of $Nb_2O_5$, 0.04 % by weight of $Tb_4O_7$ and 0.05 % by weight of $Tl_2O$ was supported in a similar manner as in Example 1 on a sintered SiC carrier of 6 mm $\phi$ × 6 mm length in an amount of 10 g/100 cc carrier to obtain a supported catalyst for oxidation of naphthalene. Naphthalene was oxidized in a reaction tube, as used in Example 1, packed with the catalyst under the condition of N.T. of 410°C and S.V. of 3,000 hr$^{-1}$ and naphthalene concentration of 30 1-air/g-naphthalene to obtain phthalic anhydride in a yield of 101 % by weight. The phthalic anhydride contained 1 % of naphthoquinone.

What is claimed is:
1. A supported catalyst for the preparation of phthalic anhydride by vapor phase catalytic oxidation of either ortho-xylene or naphthalene with molecular oxygen-containing gas consisting essentially of a catalytically active substance and a porous inert carrier, said catalytically active substance consisting essentially of 1 to 20 parts by weight of $V_2O_5$ and, correspondingly, 99 to 80 parts by weight of $TiO_2$ and, based on the total weight of the $V_2O_5$ and $TiO_2$, 0.02 to 5.0% by weight of $Nb_2O_5$, 0.1 to 5.0% by weight of $P_2O_5$, 0 to 0.25 % by weight of $K_2O$ and 0 to 0.5% by weight of $Ca_2O$, the total amount of the $K_2O$ and $Cs_2O$ being at least 0.05% by weight, said porous inert carrier having an aluminum compound content, calculated as $Al_2O_3$, of at most 10% by weight, SiC content of at least 50 % by weight and an apparent porosity of at least 10%, and in the supported catalytically active layer at least 50% of the total pore volume in pores of diameters less than 10 microns being in pores of diameters between 0.10 micron and 0.45 micron.

2. A catalyst according to claim 1, wherein the porous inert carrier has a content of aluminum compound, calculated as $Al_2O_3$, of at most 5 % by weight, SiC content of at least 80 % by weight and an apparent porosity of 15 to 40 %.

3. A catalyst according to claim 1, wherein the porous inert carrier is a sintered SiC having SiC content of at least 98 % by weight and an apparent porosity of 25 to 40 %.

4. A catalyst according to claim 1, wherein the $TiO_2$ is of anatase form.

5. A supported catalyst for the preparation of phthalic anhydride by vapor phase catalytic oxidation of either ortho-xylene or naphthalene with molecular oxyden-containing gas consisting essentially of a catalytically active substance and a porous inert carrier said catalytically active substance consisting essentially of 1 to 20 parts by weight of $V_2O_5$ and, correspondingly, 99 to 80 parts by weight of $TiO_2$ and, based on the total weight of the $V_2O_5$ and $TiO_2$, 0.02 to 5.0% by weight of $Nb_2O_5$, 0.1 to 5.0% by weight of $P_2O_5$, 0 to 0.25% by weight of $K_2O$, 0 to 0.5% by weight of $Cs_2O$, the total weight of the $K_2O$ and $Cs_2O$ being at least 0.05% by weight, 0 to 5.0% by weight of at least one member selected from the group consisting of oxides of rare earth elements, ZnO and $Ti_2O$, said porous inert carrier having an aluminum compound content, calculated as $Al_2O_3$, of at most 10% by weight, SiC content of at least 50% by weight and an apparent porosity of at least 10%, and in the supported catalytically active layer at least 50% of the total pore volume in pores of diameters less than 10 microns being in pores of diameters between 0.10 micron and 0.45 micron.

6. A catalyst according to claim 1, wherein the porous inert carrier has a content of aluminum compound, calculated as $Al_2O_3$, of at most 5 % by weight, a SiC content of at least 80 % by weight and an apparent porosity of 15 to 40 %.

7. A catalyst according to claim 5, wherein the porous inert carrier is sintered SiC having SiC content of at least 98 % by weight and an apparent porosity of 25 to 40 %.

8. A catalyst according to claim 5, wherein the $TiO_2$ is of anatase form.

* * * * *